(12) United States Patent
Martis

(10) Patent No.: US 11,620,625 B2
(45) Date of Patent: *Apr. 4, 2023

(54) MICROMARKET SECURITY SYSTEM AND METHOD

(71) Applicant: Averigo LLC, Cerritos, CA (US)

(72) Inventor: Wilfred Martis, Cerritos, CA (US)

(73) Assignee: Averigo LLC, Cerritos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,351

(22) Filed: Nov. 9, 2021

(65) Prior Publication Data

US 2022/0138715 A1 May 5, 2022

Related U.S. Application Data

(63) Continuation of application No. 16/428,486, filed on May 31, 2019, now Pat. No. 11,182,763.

(60) Provisional application No. 62/682,112, filed on Jun. 7, 2018.

(51) Int. Cl.
*G06Q 20/20* (2012.01)
*H04W 12/04* (2021.01)
*G07C 9/00* (2020.01)

(52) U.S. Cl.
CPC ....... *G06Q 20/206* (2013.01); *G07C 9/00309* (2013.01); *H04W 12/04* (2013.01); *G07C 2009/00325* (2013.01)

(58) Field of Classification Search
CPC ............. G06Q 20/206; G07C 9/00309; G07C 2009/00325; H04W 12/04
USPC ............... 340/10.1–10.52; 705/26; 235/383
See application file for complete search history.

(56) References Cited

U.S. PATENT DOCUMENTS

| | | | | |
|---|---|---|---|---|
| 9,760,871 | B1 * | 9/2017 | Pourfallah | G06Q 20/405 |
| 9,911,290 | B1 * | 3/2018 | Zalewski | G06Q 30/0633 |
| 10,332,078 | B2 * | 6/2019 | Mori | G06Q 20/209 |
| 10,846,996 | B2 * | 11/2020 | Schoner | G07G 1/0063 |
| 11,182,763 | B1 * | 11/2021 | Martis | H04W 4/024 |
| 2008/0300780 | A1 * | 12/2008 | Domnin | G01C 21/20 |
| | | | | 701/533 |
| 2008/0308630 | A1 * | 12/2008 | Bhogal | G07G 1/009 |
| | | | | 235/383 |
| 2009/0287584 | A1 * | 11/2009 | Brown | G06Q 30/02 |
| | | | | 705/26.1 |
| 2010/0082447 | A1 * | 4/2010 | Lin | G06Q 30/0601 |
| | | | | 705/26.1 |

(Continued)

*Primary Examiner* — Nam V Nguyen
(74) *Attorney, Agent, or Firm* — Richard T. Ogawa; Ogawa P.C.

(57) ABSTRACT

In an example, the present invention provides a local area network system for a micro-market application. The system has a world wide network of computers, which comprising the Internet. In an example, the system has a micro market server device coupled to the world wide network of computers. In an example, the micro market server device has a library comprising a listing of a plurality of products, a field configured with the association information, e.g., an identifier for the server device. In an example, the product information is associated with the plurality of products is provided in a product catalog file. The device has a plurality of fields associated with a plurality of micromarket identification information. The micromarket identification information is a unique identifier for the particular micromarket.

20 Claims, 12 Drawing Sheets

Simplified diagram of a geographic region of a private office building with a Bluetooth-beacon-based micromarket

(56) References Cited

U.S. PATENT DOCUMENTS

| | | | | |
|---|---|---|---|---|
| 2011/0066504 A1* | 3/2011 | Chatow | G06Q 30/02 |
| | | | 705/14.65 |
| 2012/0136698 A1* | 5/2012 | Kent | G06Q 20/3276 |
| | | | 705/14.1 |
| 2012/0209749 A1* | 8/2012 | Hammad | G06Q 20/326 |
| | | | 705/27.1 |
| 2014/0316901 A1* | 10/2014 | Grabovski | G06Q 30/0268 |
| | | | 705/14.65 |
| 2015/0039458 A1* | 2/2015 | Reid | A61B 5/117 |
| | | | 705/26.1 |
| 2017/0103367 A1* | 4/2017 | Borgmeyer | G06Q 20/342 |
| 2018/0144389 A1* | 5/2018 | Fredrich | G06Q 30/0271 |
| 2018/0240095 A1* | 8/2018 | Buckley | G06Q 30/0601 |
| 2018/0365753 A1* | 12/2018 | Fredrich | G06F 40/205 |

* cited by examiner

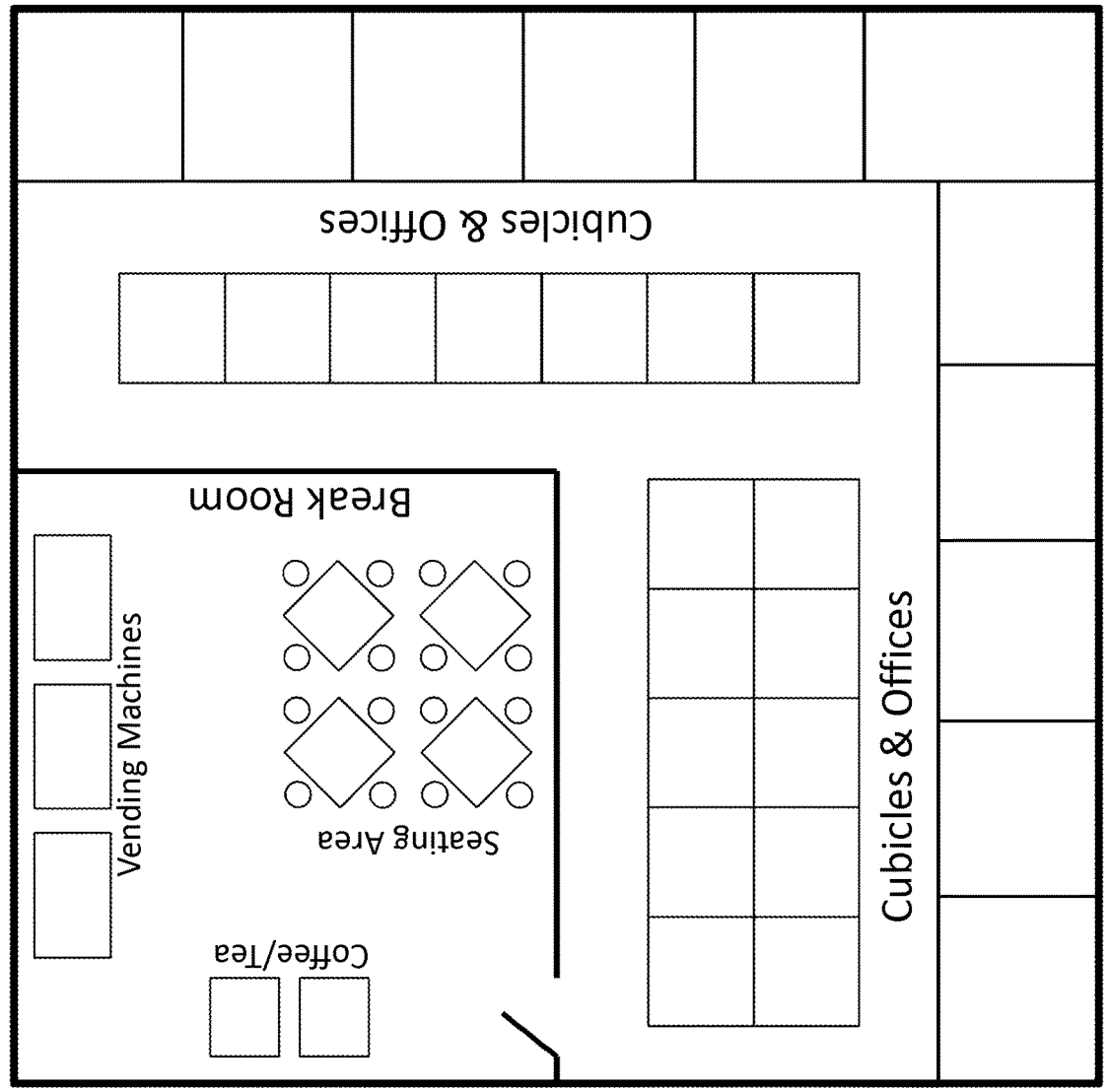
Figure 1: Simplified diagram of a geographic region of a private office building

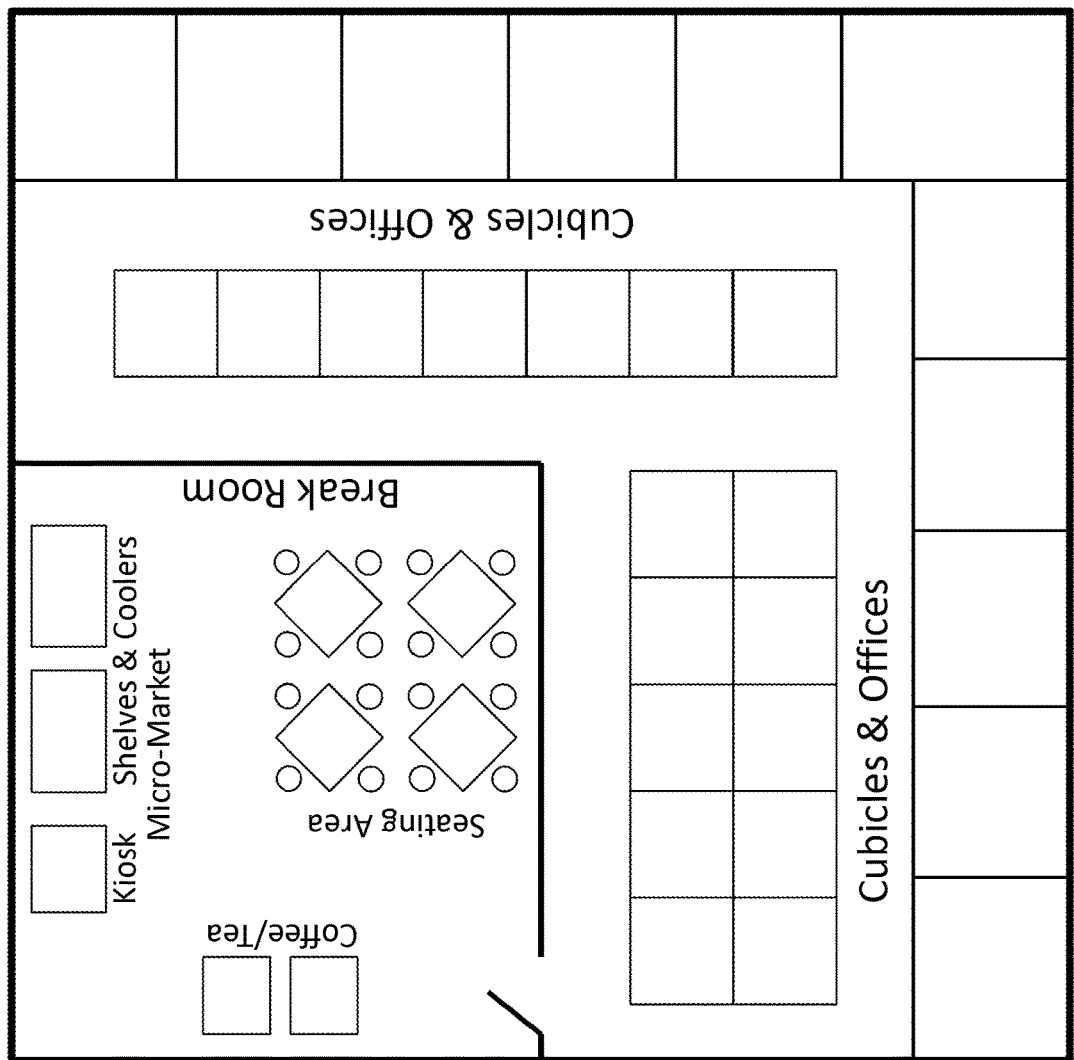
Figure 2: Simplified diagram of a geographic region of a private office building with a kiosk-based micromarket

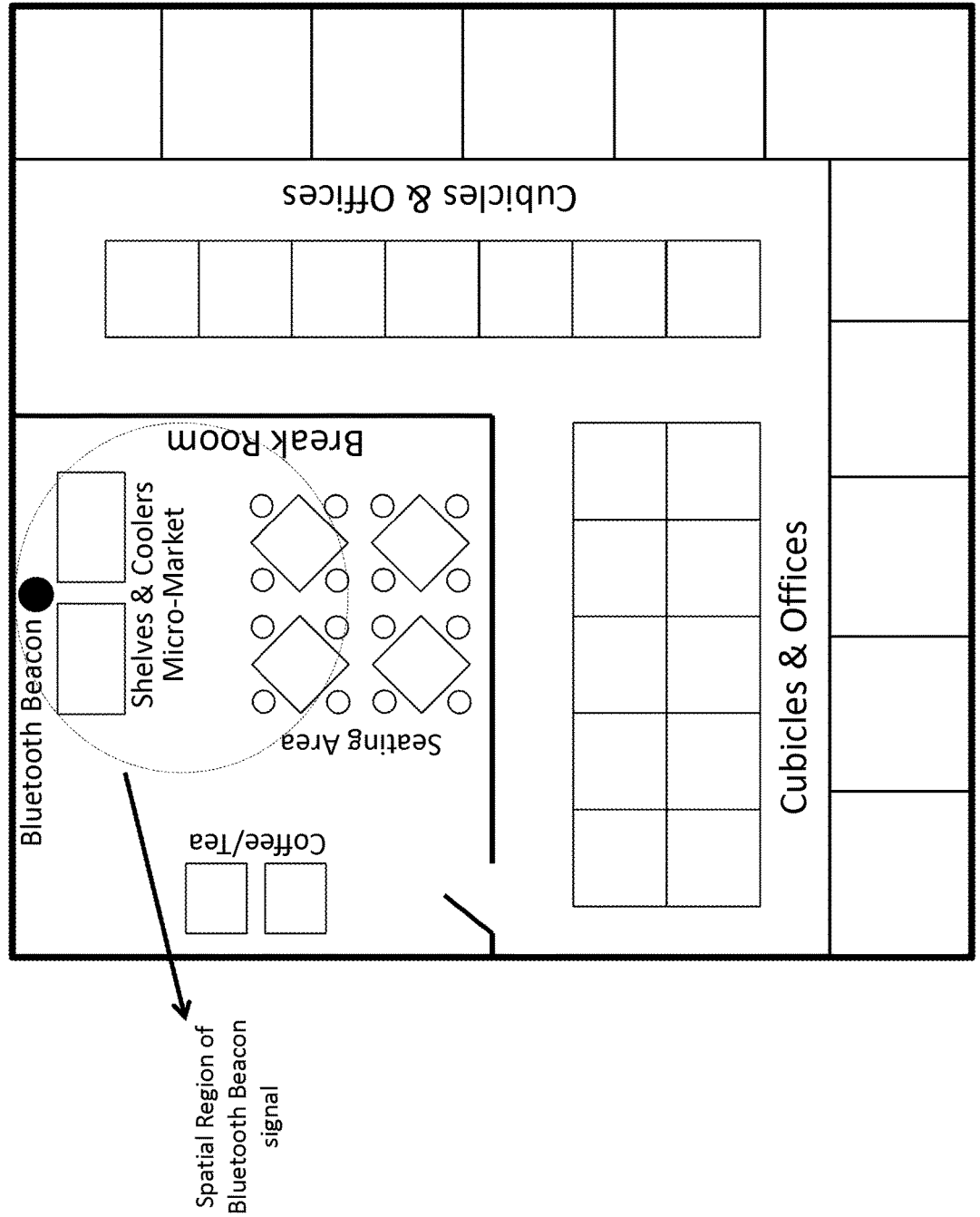
Figure 3: Simplified diagram of a geographic region of a private office building with a Bluetooth-beacon-based micromarket

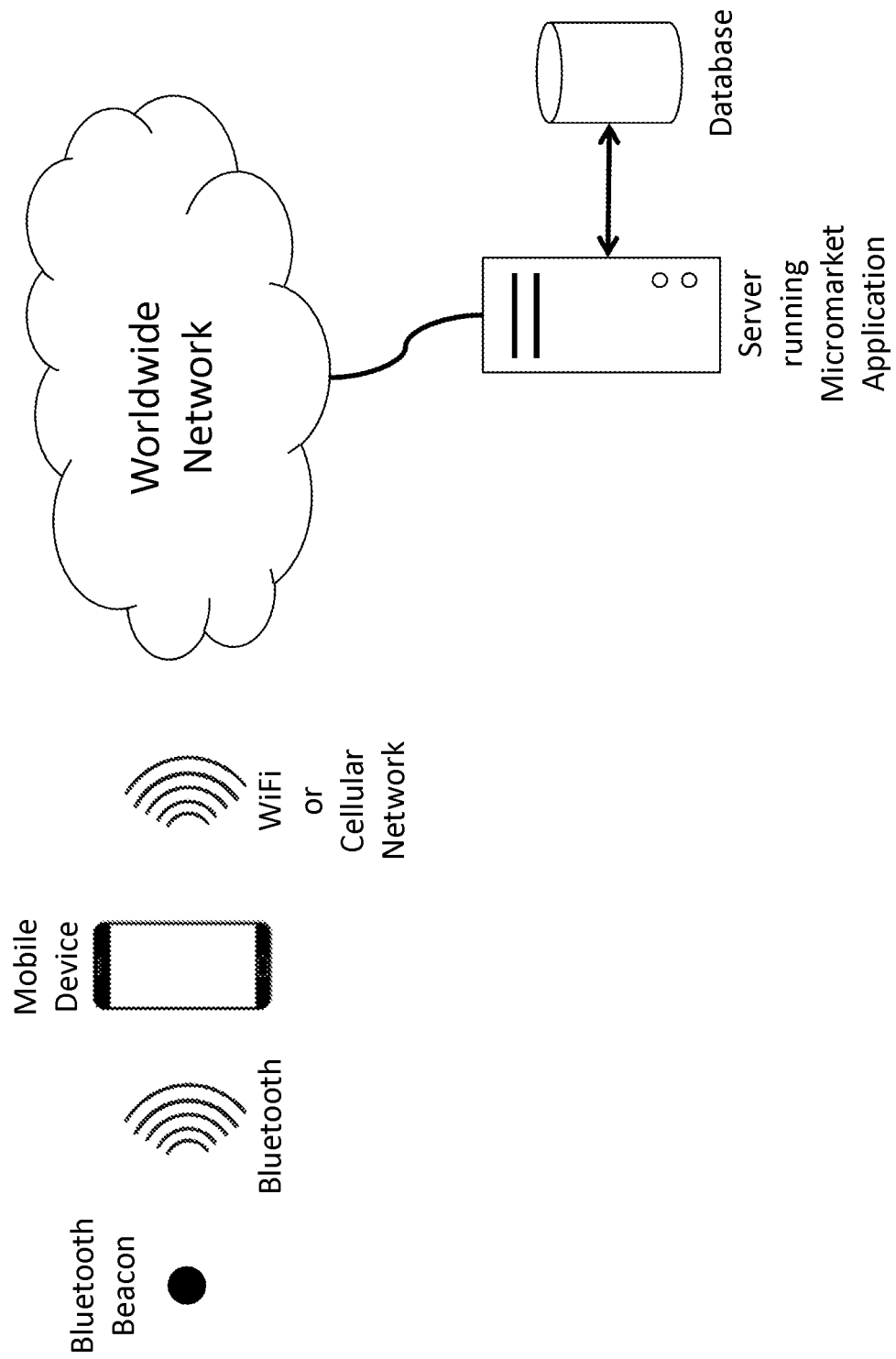
Figure 4: Simplified network diagram of a micromarket system

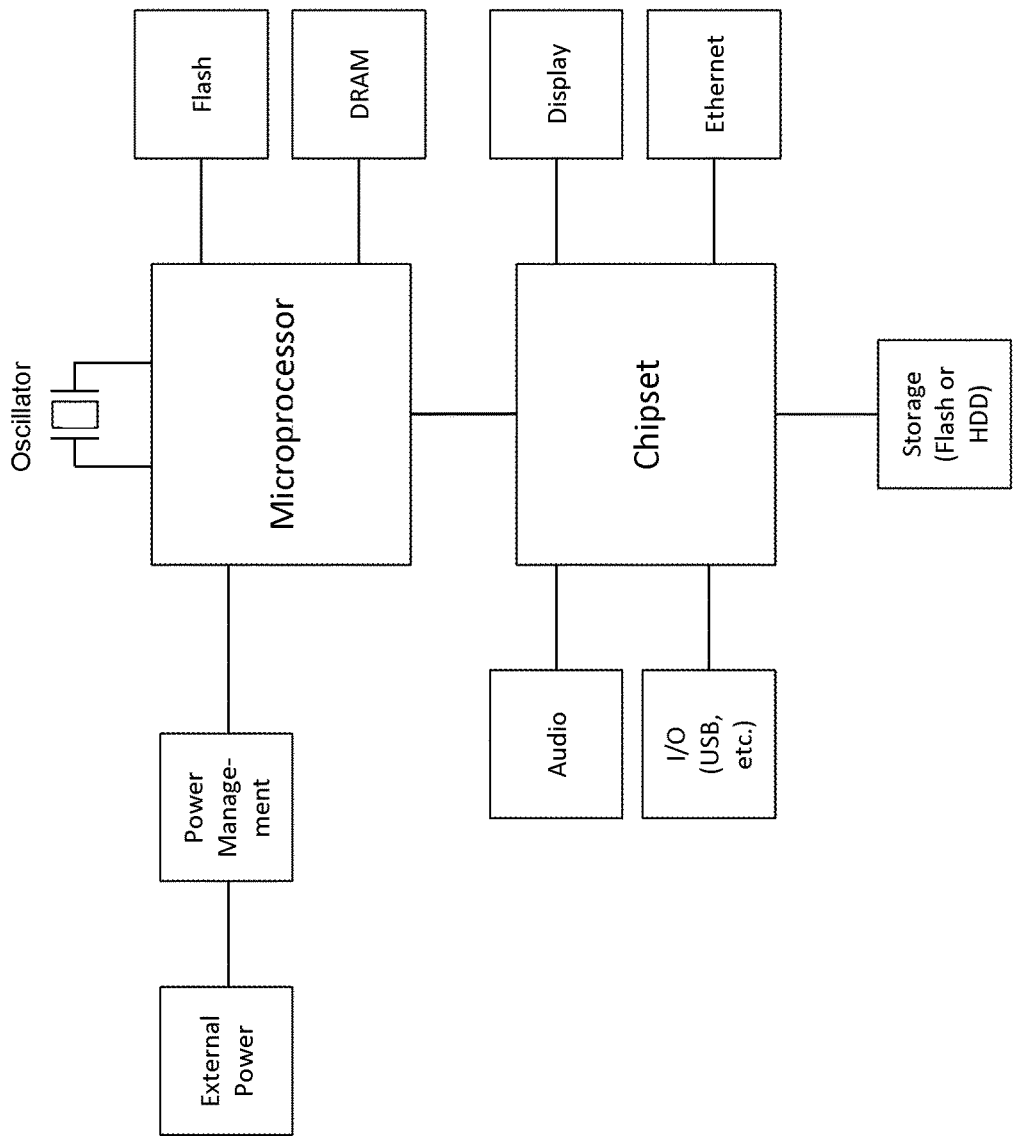
Figure 5: Detailed diagram of a micromarket server device

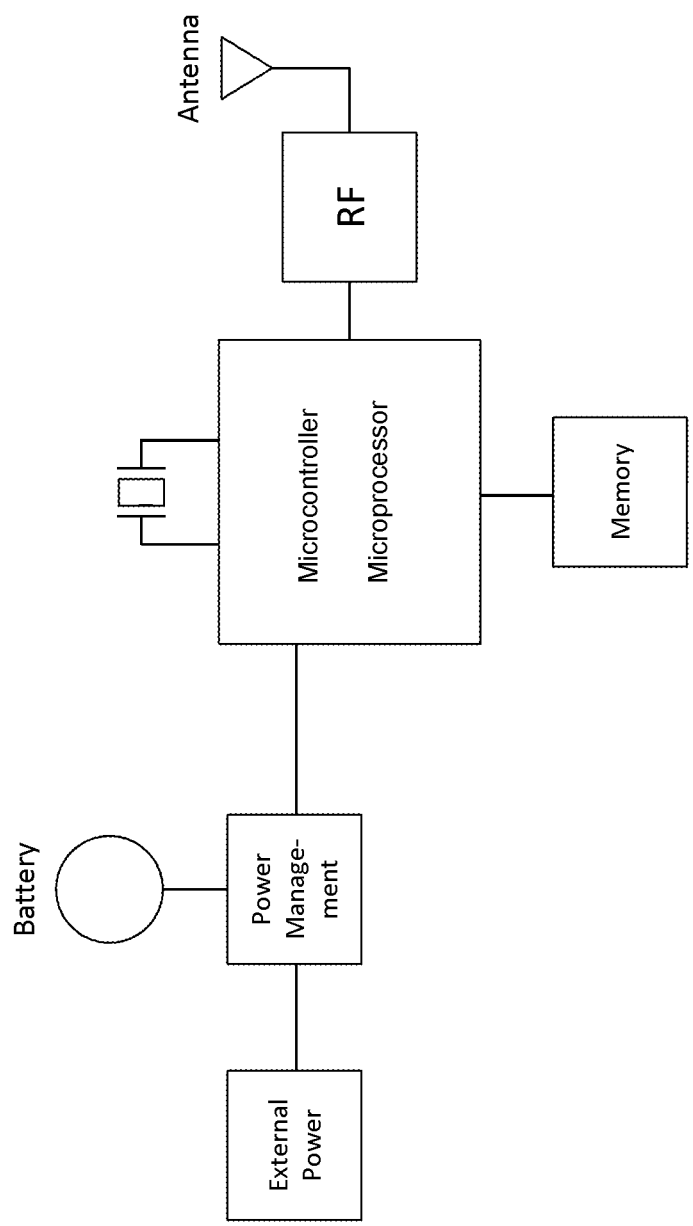
Figure 6: Detailed diagram of a micromarket wireless transmitter device

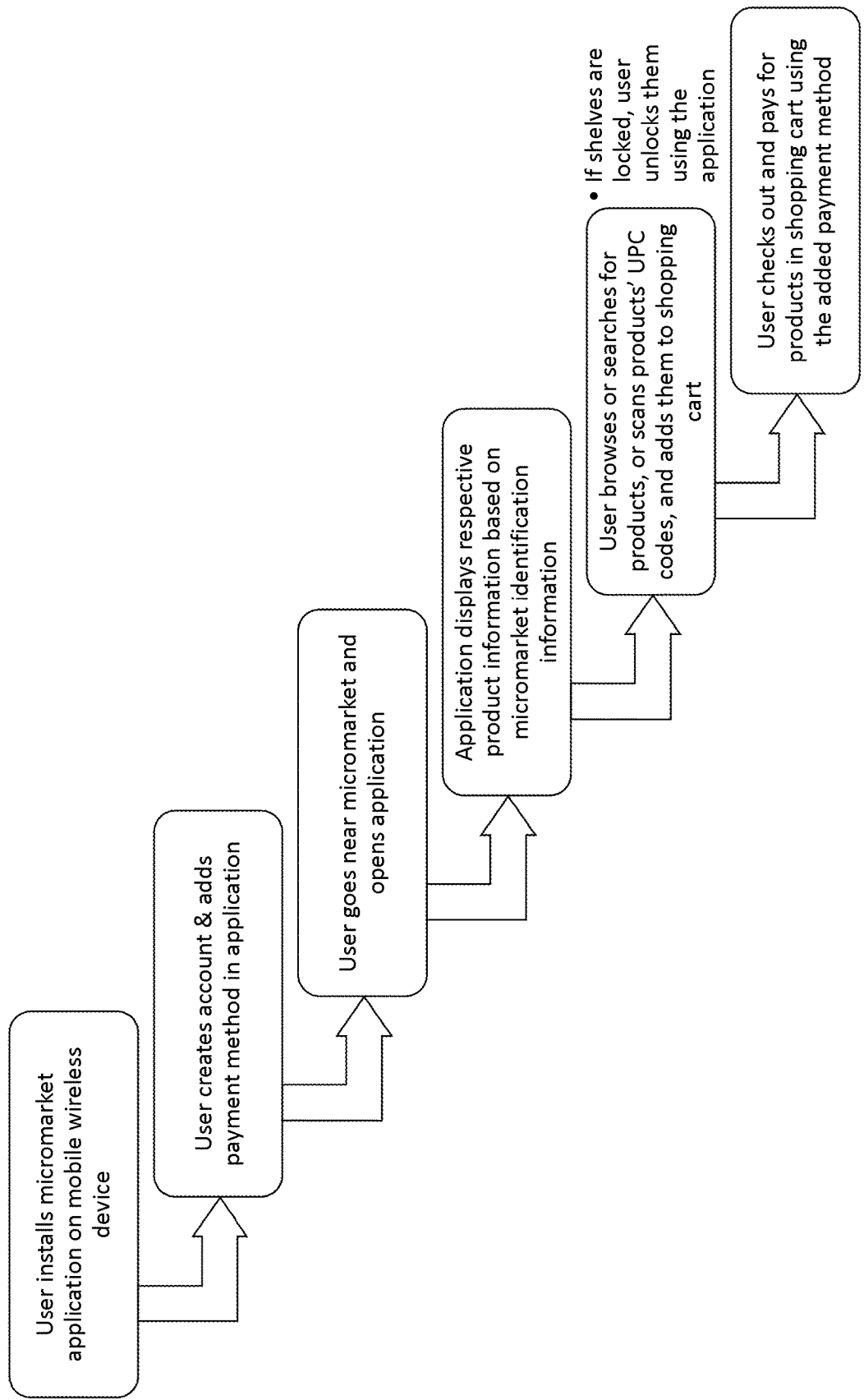
Figure 7: Simplified flow diagram of a process using the micromarket application

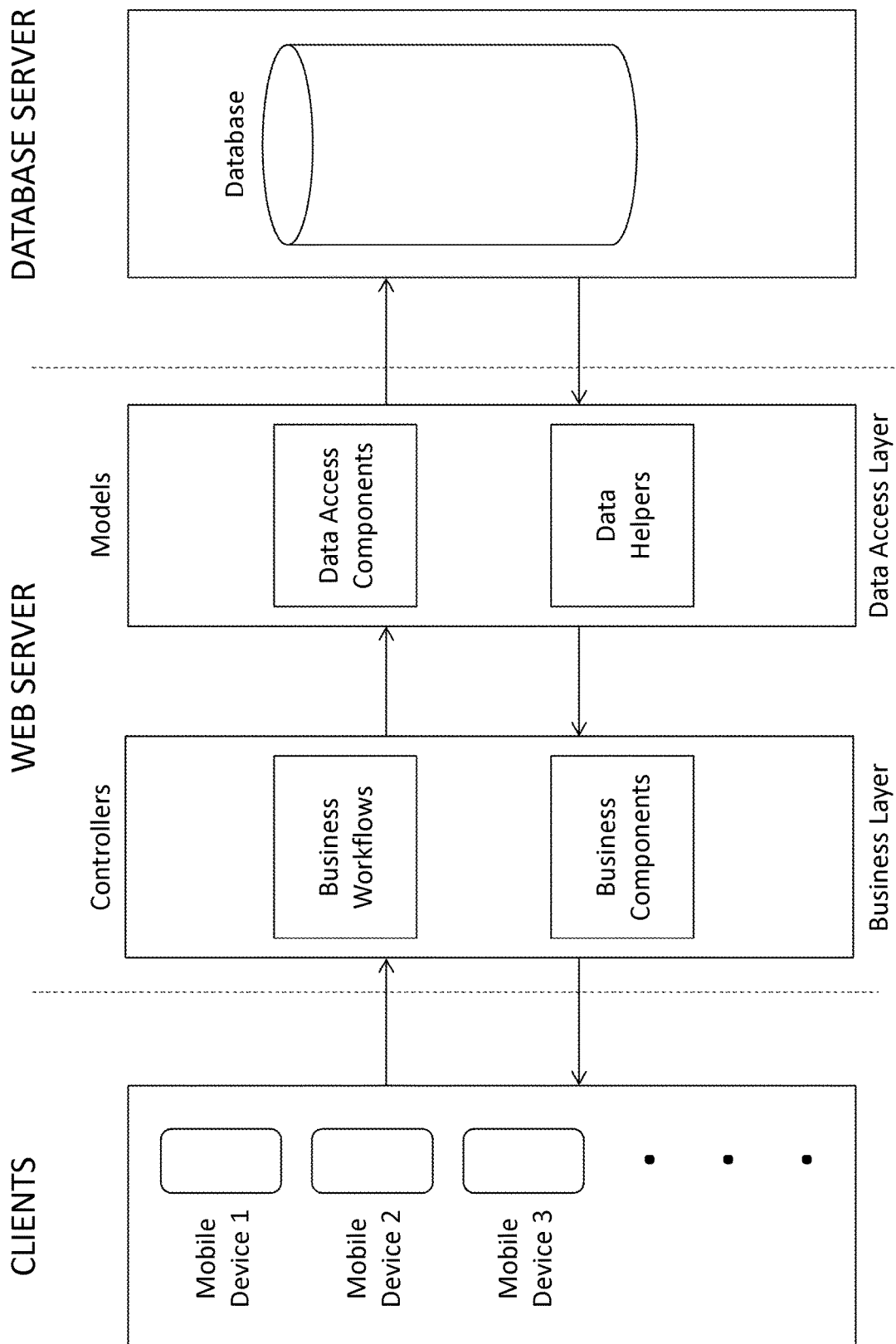
Figure 8: Overall System Architecture

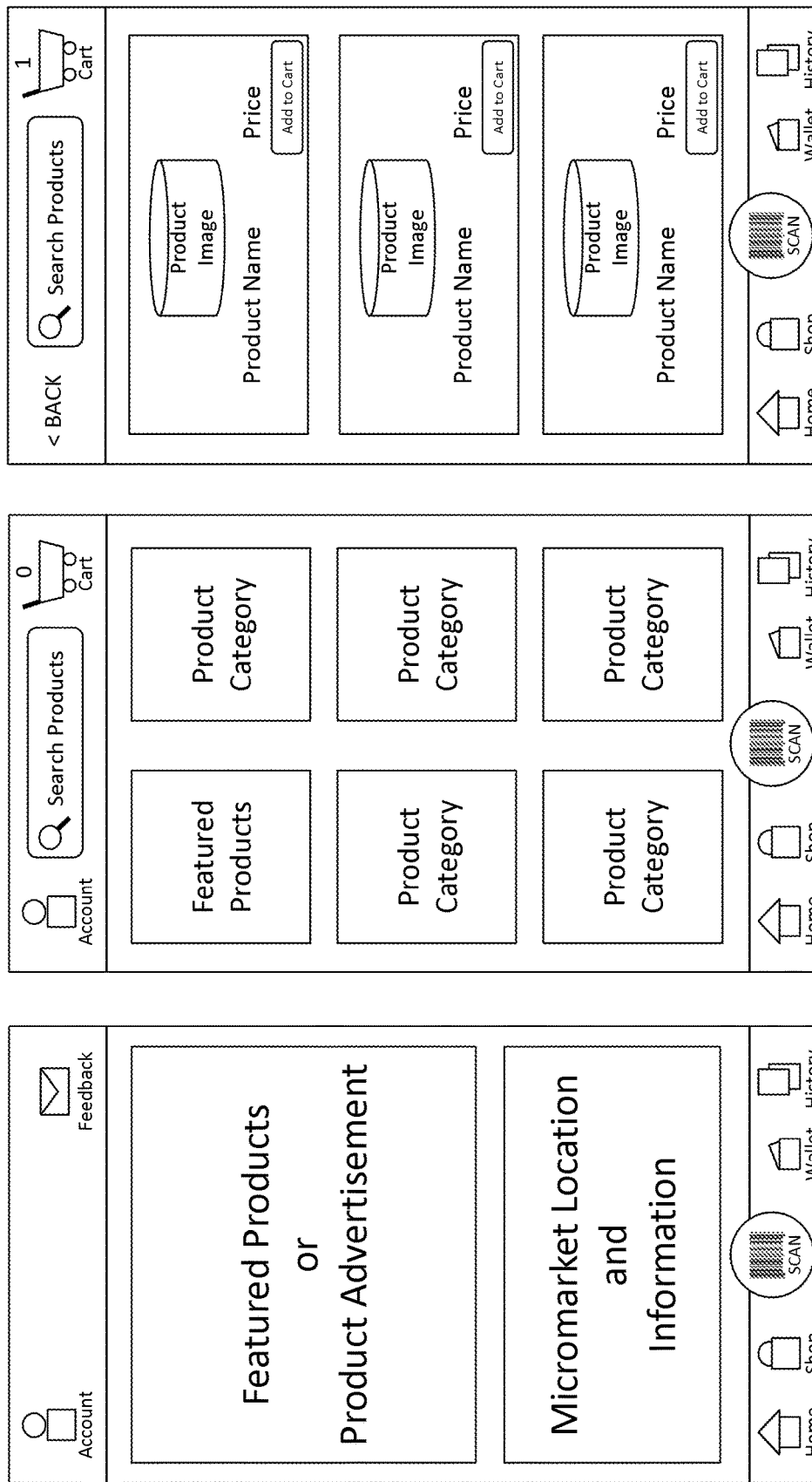
Figure 9: User interfaces of the micromarket application

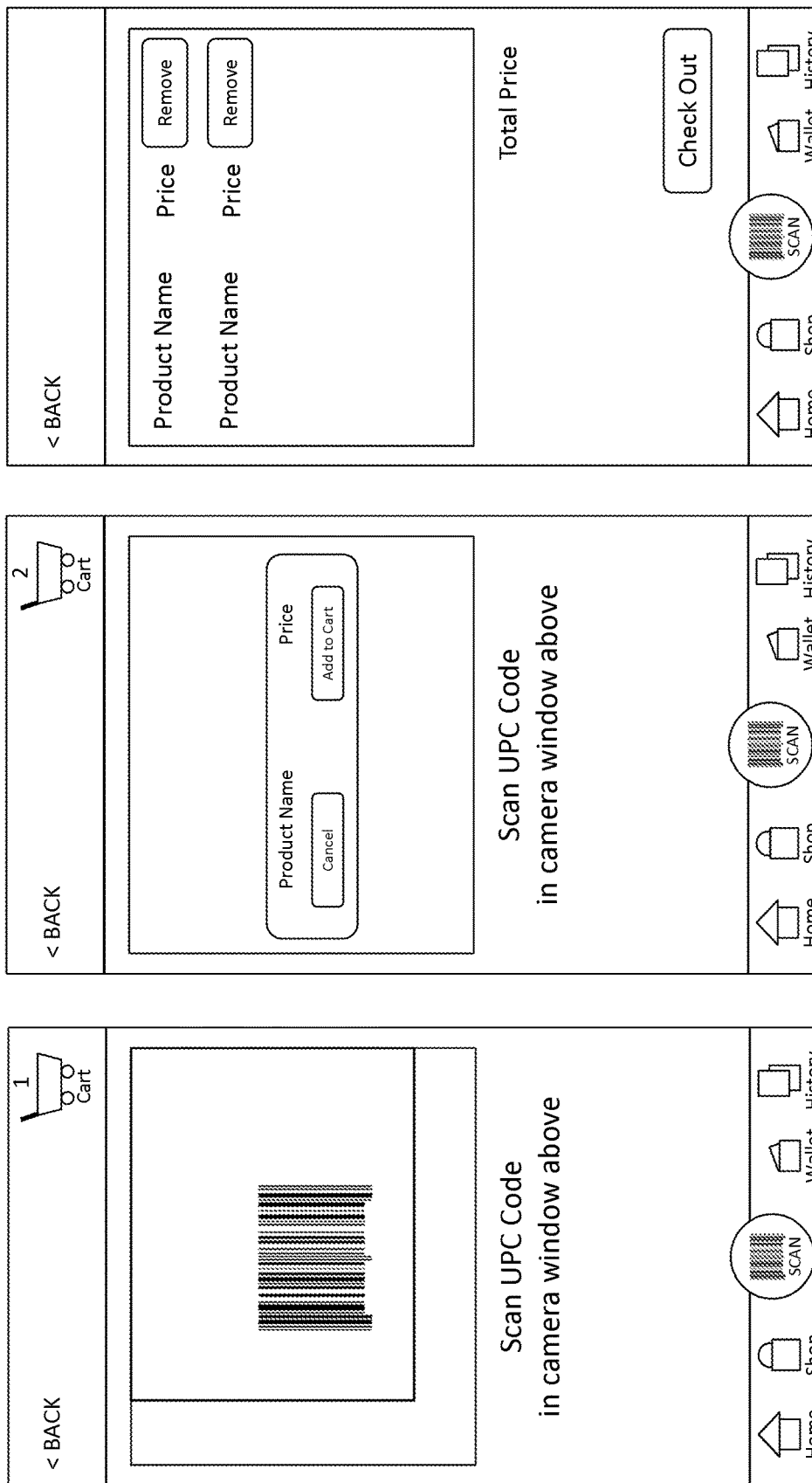
Figure 10: User interfaces of the micromarket application

Figure 11: User interfaces of the micromarket application

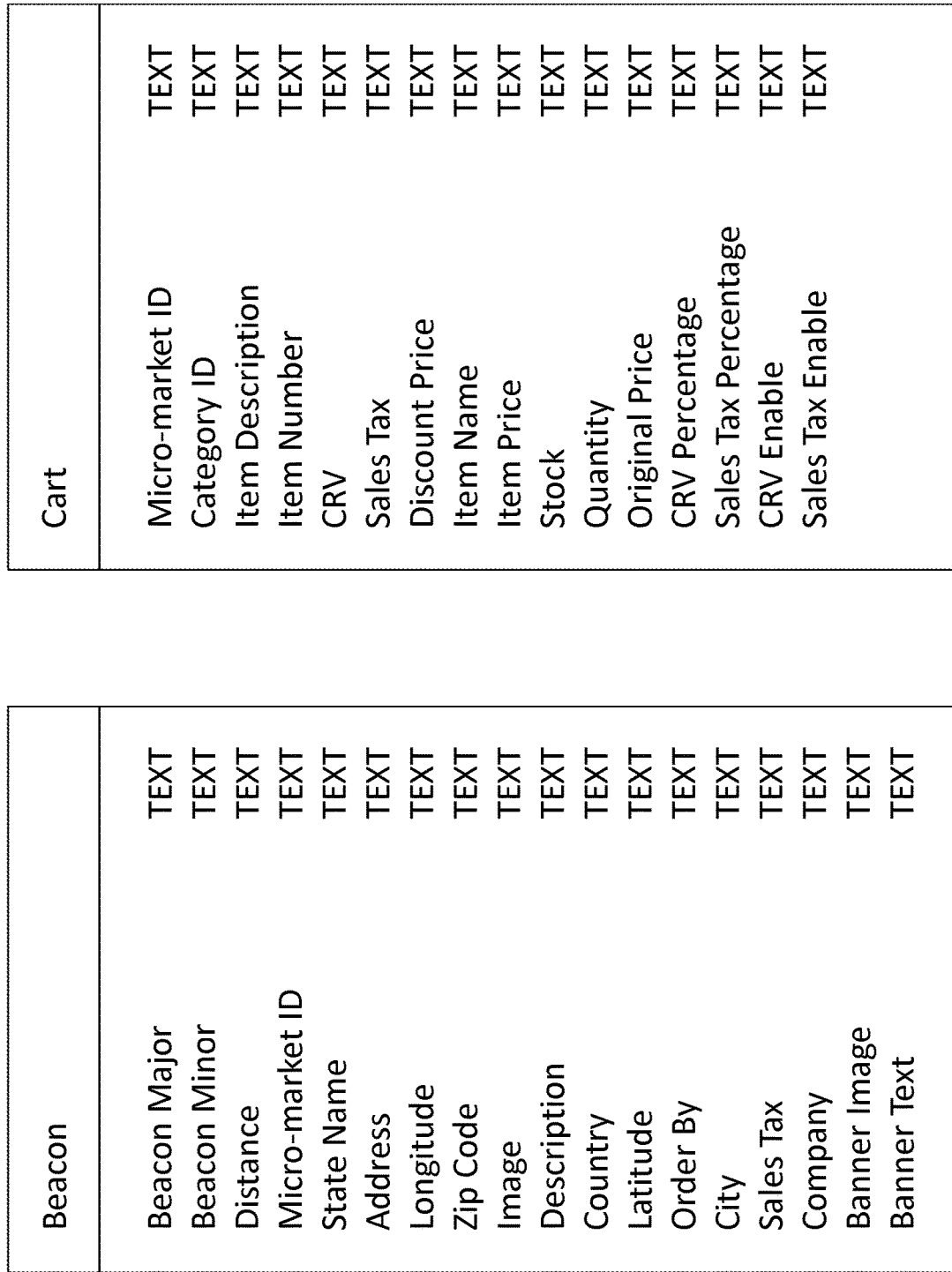
Figure 12: Database diagram of micromarket application

MICROMARKET SECURITY SYSTEM AND METHOD

CROSS-REFERENCE TO RELATED PATENT APPLICATION

This application is a continuation of U.S. application Ser. No. 16/428,486, filed May 31, 2019, and issued as U.S. Pat. No. 11,182,763 on Nov. 23, 2021, which claims priority to U.S. Provisional Application No. 62/682,112, filed on Jun. 7, 2018, which are hereby incorporated by reference in their entirety.

BACKGROUND

The present invention relates generally to processing techniques related to secured transactions. In particular, the invention provides a method and system for using a wireless beacon to initiate a secure transaction using a micromarket and a specialized application configured for the secure transaction. Merely by way of example, the invention has been applied to a mobile computing device configured to a world wide network of computers, however, the invention has many other applications.

Markets for exchanging goods have been used for thousands of years. From the early days of open air markets in the middle ages, to exchange farm and hand made goods, to current department stores, electronic commerce, and most recently the use of kiosks for exchanging a product for currency. As an example, an "electronic kiosk (or computer kiosk or interactive kiosk) houses a computer terminal that often employs custom kiosk software designed to function while preventing users from accessing system functions. Indeed, kiosk mode describes such a mode of software operation." www.wikipedia.com. "Computerized kiosks may store data locally, or retrieve it from a computer network. Some computer kiosks provide a free, informational public service, while others serve a commercial purpose (see mall kiosk)." "Touchscreens, trackballs, computer keyboards, and pushbuttons are all typical input devices for interactive computer kiosk." "Touchscreen kiosks are commercially used as industrial appliances, reducing lines, eliminating paper, improving efficiency and service." Unfortunately, "their uses are unlimited from refrigerators to airports, health clubs, movie theaters and libraries." Additionally, other limitations include long lines during times of peak demands.

Although successful, it is desired to have a secure market place for smaller geographic regions.

SUMMARY OF INVENTION

According to the present invention, techniques related generally to processing of secured transactions are provided. In particular, the invention provides a method and system for using a wireless beacon to initiate a secure transaction using a micromarket and a specialized application configured for the secure transaction. Merely by way of example, the invention has been applied to a mobile computing device configured to a world wide network of computers, however, the invention has many other applications.

In an example, the present invention provides a local area network system for a micro-market application. The system has a world wide network of computers, which comprising the Internet. In an example, the system has a micro market server device coupled to the world wide network of computers. In an example, the micro market server device has a library comprising a listing of a plurality of products, a field configured with the association information, e.g., an identifier for the server device. The device has a plurality of fields associated with a plurality of micromarket identification information. In an example, the system has a spatial region comprising a physical region having an effective radius of less than twenty feet. The system has a micromarket wireless transmitter device configured with identification information comprising an association identification information and a micromarket identification information. In an example, the micromarket wireless transmitter device is spatially disposed within the spatial region. The wireless transmitter is configured to transmit a beacon comprising wireless signal having a frequency ranging from 2 GHz to 3 GHz, among others. The system has a geofence region configured within a vicinity of the spatial region and derived from a perimeter of the wireless signal. The system has a micro market comprising a shelf configured with a wireless lock. The shelf having a plurality of products to be displayed. In an example, the system has a mobile wireless device of a user. The mobile wireless device comprises a processor device, a memory device, and a receiver for a local area network and a transceiver for communication to the world wide network of computers. The mobile wireless device can be a cell phone, such as a Smart Phone, tablet, or other computing device configured with a wireless transceiver.

In an example, the system has a micromarket application configured with the processor device to receive the association information and the micromarket identification information regarding the plurality of products within the geofence, when the mobile wireless device is within the geofence region by movement of the user, and initiates a connection with the wireless transmitter device, and upon the input of the association information and the micromarket identification to the micromarket application, the micromarket application initiates connection to the micro market server device which is configured to transfer product information regarding the plurality of products to the micromarket application.

In an example, an image capturing device is provided in the mobile wireless device, and is coupled to the micromarket application, and is configured to receive a UPC code associated with at least one of the plurality of products. In an example, the micromarket application is configured to transfer purchase information regarding the product into a shopping cart configured with the micromarket application and check out the product in exchange for a payment obligation for the product.

Depending upon the example, one or more benefits are achieved. In an example, a micromarket can be set up in a secure manner without any access to a network, such as a computer network or a network connection to the micromarket. In an example, during peak hours, a user of the micromarket has little or no wait time, since products can be picked up, scanned, and taken away, without a physical gateway or security process. In other examples, the present system is low cost, which allows for a user to set up multiple smaller locations without the need for network connections or a clerk, and easy to set up. In other examples, the present system can also maintain user analytics, use history, and other information that can be personally used by the user, or collected in bulk. Of course, there can be other benefits, or advantages in other examples.

The above examples and implementations are not necessarily inclusive or exclusive of each other and may be combined in any manner that is non-conflicting and otherwise possible, whether they be presented in association with a same, or a different, embodiment or example or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above examples implementations are illustrative, rather than limiting.

BRIEF DESCRIPTION OF THE FIGURES

FIG. 1 is a simplified diagram of a geographic region of a private office building according to an example.

FIG. 2 is a simplified diagram of a geographic region of a private office building with a micro market according to an example.

FIG. 3 is a simplified diagram of a geographic region of a private office building with a micro market according to an example.

FIG. 4 is a simplified network diagram of a micromarket system according to an example.

FIG. 5 is a more detailed diagram of a micromarket server device according to an example.

FIG. 6 is a more detailed diagram of a micromarket wireless transmitter device according to an example.

FIG. 7 is a more detailed diagram of a micromarket application according to an example.

FIG. 8 is a detailed diagram of an overall system architecture according to an example.

FIGS. 9 to 11 are various user interfaces for the micromarket application according to an example.

FIG. 12 is a simplified diagram of a database schema according to an example.

DETAILED DESCRIPTION OF THE EXAMPLES

According to the present invention, techniques related generally to processing of secured transactions are provided. In particular, the invention provides a method and system for using a wireless beacon to initiate a secure transaction using a micromarket and a specialized application configured for the secure transaction. Merely by way of example, the invention has been applied to a mobile computing device configured to a world wide network of computers, however, the invention has many other applications.

In an example, the present invention provides a local area network system for a micro-market application. The system has a world wide network of computers, which comprising the Internet. In an example, the system has a micro market server device coupled to the world wide network of computers. In an example, the micro market server device has a library comprising a listing of a plurality of products, a field configured with the association information, e.g., an identifier for the server device. In an example, the product information is associated with the plurality of products is provided in a product catalog file. The device has a plurality of fields associated with a plurality of micromarket identification information. The micromarket identification information is a unique identifier for the particular micromarket.

In an example, the system has a spatial region comprising a physical region having an effective radius of less than twenty feet. The system has a micromarket wireless transmitter device configured with identification information comprising an association identification information and a micromarket identification information. In an example, the micromarket wireless transmitter device is spatially disposed within the spatial region.

The wireless transmitter is configured to transmit a beacon comprising wireless signal having a frequency ranging from 2 GHz to 3 GHz, among others. In an example, the wireless transmitter device is configured with a Bluetooth device having a frequency of 2.4 GHz or other frequencies. In an example, the micromarket wireless transmitter is physically attached to a back of a shelf of the micromarket to physically secure the micromarket wireless transmitter, and to be out of sight of any user of the micromarket. The wireless transmitter can be self powered via a battery or other energy source, or be plugged into a power source via a USB connection or other interface.

The system has a geofence region configured within a vicinity of the spatial region and derived from a perimeter of the wireless signal. As used herein, the term geofence is a virtual perimeter for a real-world geographic area derived from the perimeter of the wireless signal or beacon. A geo-fence could be dynamically generated—as in a radius around a point location, or a geo-fence can be a predefined set of boundaries (such as school zones or neighborhood boundaries). The use of a geo-fence is called geo-fencing, and one example of usage involves a location-aware device of a location-based service (LBS) user entering or exiting a geo-fence. This activity could trigger an alert to the device's user as well as messaging to the geo-fence operator. This info, which could contain the location of the device, could be sent to a mobile telephone or an email account. See, Wikipedia.org.

In an example, the system has a micro market comprising a shelf configured with a wireless lock. The shelf having a plurality of products to be displayed. In an example, the system has a mobile wireless device of a user. The mobile wireless device comprises a processor device, a memory device, and a receiver for a local area network and a transceiver for communication to the world wide network of computers. The mobile wireless device can be a cell phone, such as a Smart Phone, tablet, or other computing device configured with a wireless transceiver.

In an example, the system has a micromarket application configured with the processor device to receive the association information and the micromarket identification information regarding the plurality of products within the geofence, when the mobile wireless device is within the geofence region by movement of the user, and initiates a connection with the wireless transmitter device, and upon the input of the association information and the micromarket identification to the micromarket application, the micromarket application initiates connection to the micro market server device which is configured to transfer product information regarding the plurality of products to the micromarket application.

In an example, an image capturing device is provided in the mobile wireless device, and is coupled to the micromarket application, and is configured to receive a UPC code associated with at least one of the plurality of products. In an example, the micromarket application is configured to transfer purchase information regarding the product into a shopping cart configured with the micromarket application and check out the product in exchange for a payment obligation for the product.

In an example, the micromarket application comprises a security module. In an example, the security module is configured to transfer a key to the wireless lock when the product has been checked out in exchange for the payment such that the wireless lock is released to allow the user to remove the product from the micromarket.

In an example, the system further comprises a security module. The security module is configured to transfer a key using a 2.4 GHz wireless signal or other signal related to Bluetooth to the wireless lock when the product has been checked out in exchange for the payment such that the wireless lock is released to allow the user to remove the product from the micromarket. In an example, the key can be configured with the lock to release the product that is to allow the user to remove it for viewing and scanning. Once the lock is latched, and secures the product after payment, and the product has been removed.

In an example, the system further comprises an alert module configured to transfer an alert from the micromarket server to the micromarket application once connection has been established between the micromarket application and the micromarket wireless transmitter device. In an example, the alert module is provided in the micromarket server. In an example, the alert module is configured to transfer an alert from the micromarket server to the micromarket application once connection has been established between the micromarket application and the micromarket wireless transmitter device. The alert is associated with one of the plurality of products.

Further details of the present system and related method can be found throughout the present specification and more particularly below.

FIG. 1 is a simplified diagram of a geographic region of a private office building according to an example. As shown, the private office building is often within a private office area with a plurality of users. In an example, each of the users is an employee of a company. In an example, the private office area is free from any kiosk or other vending machine or may have a kiosk. In this private office building, there is limited use of any micromarket and the kiosk is heavily used during lunch and other breaks.

In an example, the region has shelves, and a refrigerator, each of which is packed with drinks, snacks, food, and other items to eat. Employees take them for free, and the company does not charge for them. In some cases, some employees take more than their fair share, and pack them away for the weekend.

FIG. 2 is a simplified diagram of a geographic region of a private office building with a kiosk based micro market according to an example, and FIG. 3 is a simplified diagram of a geographic region of a private office building with a micro market according to an example. As shown, the private office building is often within a private office area with a plurality of users. In an example, each of the users is an employee of a company. In an example, the private office area is free from any kiosk or other vending machine or may have a kiosk. In this private office building, a present micromarket system including a micromarket wireless transmitter device is included.

In an example, the micromarket wireless transmitter device is spatially disposed in a hidden area. In an example, the micromarket wireless transmitter is physically attached to a back of a shelf (or plugged into an outlet within a vicinity of the micromarket) of the micromarket to physically secure the micromarket wireless transmitter, and to be out of sight of any user of the micromarket.

FIG. 4 is a simplified network diagram of a micromarket system according to an example. In an example, a local area network system for a micro-market application is provided. The system has a world wide network of computers, as shown. The world wide network of computers comprising the Internet, and any other interconnected network system.

In an example, the network is coupled to a micro market server device. In an example, the micromarket server has various elements. In an example, the micromarket server has a database. The database has a library comprising a listing of a plurality of products. In an example, the database has a field configured with the association information. In an example the association information is an identifier for the server device to access the present system. In an example, the database has a plurality of fields associated with a plurality of micromarket identification information.

In an example, the micromarket system is configured within a spatial region comprising a physical region having a short range measured by an effective radius. In an example, the effective radius is less than twenty feet, less than fifty feet, less than one hundred feet but can also include other variations. The physical area can be within a cafeteria, an outside region, or other region.

In an example, the system has a micromarket wireless transmitter device configured with identification information comprising an association identification information and a micromarket identification information. In an example, the micromarket wireless transmitter device is spatially disposed within the spatial region. The wireless transmitter is configured to transmit a beacon comprising wireless signal having a frequency ranging from 2 GHz to 3 GHz or other desirable frequencies.

In an example, the system creates a geofence region configured within a vicinity of the spatial region and derived from a perimeter of the wireless signal. That is, the beacon emits wireless signals having a certain range to form the geofence.

In an example, the system has a micro market comprising a shelf configured with a wireless lock, the shelf having a plurality of products to be displayed. The shelf is free and can be accessed by a user, unlike a kiosk or vending machine. In an example, the shelf can be accessed by multiple users without interference of a single interface or gateway of the kiosk or vending machines.

In an example, the system has a plurality of users each of them having a mobile wireless device. In an example, the mobile wireless device is selected from a smart phone, a cellular phone, a tablet computer, or a laptop computer. The mobile wireless device has a transmitter and/or receiver for a telecommunication network, such as 3G, LTE, or 5G. In an example, the device also has a transmitter and/or receiver for a local area network, such as WiFi or an equivalent. In an example, the device has a transmitter/receiver for a personal area networks, such as Bluetooth™ or others. As used herein, the term Bluetooth is a wireless technology standard for exchanging data over short distances (using short-wavelength UHF radio waves in the ISM band from 2.4 to 2.485 GHz) from fixed and mobile devices, and building personal area networks (PANs). Bluetooth is managed by the Bluetooth Special Interest Group (SIG), which has more than 30,000 member companies in the areas of telecommunication, computing, networking, and consumer electronics. The IEEE standardized Bluetooth as IEEE 802.15.1, but no longer maintains the standard. The Bluetooth SIG oversees development of the specification, manages the qualification program, and protects the trademarks. A manufacturer must meet Bluetooth SIG standards to market it as a Bluetooth device. Further details on Bluetooth can be found at https://en.wikipedia.org/wiki/Bluetooth, which is incorporated by reference. In other examples, the device can have a communication interface for a meshed network, such as Zig-Bee™, ZWave™, or 6LowPan™, and others.

In an example, the mobile wireless device comprising a processor device, a memory device, and a receiver for a local area network and a transceiver for communication to the world wide network of computers.

In an example, the system has a micromarket application configured with the processor device. The process device is configured to receive the association information and the micromarket identification information regarding the plurality of products within the geofence, when the mobile wireless device is within the geofence region by movement of the user. In an example, the application initiates a connection with the wireless micromarket transmitter device. In an example, upon the input of the association information and the micromarket identification to the micromarket application, the micromarket application initiates connection to the micro market server device, which is configured to transfer product information regarding the plurality of products to the micromarket application. Of course, there can be other variations, modifications, and alternatives.

In an example, the mobile wireless device has an image capturing device provided in the mobile wireless device. The image capturing device is coupled to the micromarket application, and configured to receive a UPC code associated with at least one of the plurality of products. The image capturing device acts as a scanner to receive the UPC code in bar code form.

In an example, the micromarket application is configured to transfer purchase information regarding the product into a shopping cart configured with the micromarket application and check out the product in exchange for a payment obligation for the product.

In an example, the micromarket application comprises a security module. In an example, the security module is configured to transfer a key using a 2.4 GHz wireless signal to the wireless lock when the product has been checked out in exchange for the payment such that the wireless lock is released to allow the user to remove the product from the micromarket.

In an example, the micromarket application has an alert module configured to transfer an alert from the micromarket server to the micromarket application once connection has been established between the micromarket application and the micromarket wireless transmitter device. In an example, the alert module is configured to transfer an alert from the micromarket server to the micromarket application once connection has been established between the micromarket application and the micromarket wireless transmitter device. In an example, the alert is associated with one of the plurality of products.

FIG. 5 is a more detailed diagram of a micromarket server device according to an example. As shown, the server device has a microprocessor coupled to a memory resource, including a Flash memory devices, and DRAM devices. The microprocessor is configured with a clock, and chipset to interface between the microprocessor and other peripheral elements such as a display, a network interface (e.g., Ethernet), a fixed or Flash memory storage device, an I/O (e.g., USB), audio, and other peripherals. The server device also has external power and power management. An example is can be found on Amazon EC2 instances run on 64-bit virtual Intel processors as specified in the instance type product pages. For more information about the hardware specifications for each Amazon EC2 instance type, see Amazon EC2 Instance Types. However, confusion may result from industry naming conventions for 64-bit CPUs. Chip manufacturer Advanced Micro Devices (AMD) introduced the first commercially successful 64-bit architecture based on the Intel x86 instruction set. Consequently, the architecture is widely referred to as AMD64 regardless of the chip manufacturer. Windows and several Linux distributions follow this practice. This explains why the internal system information on an Ubuntu or Windows EC2 instance displays the CPU architecture as AMD64 even though the instances are running on Intel hardware. Of course, there can be other alternatives, variations, and modifications. See, for example, https://docs.aws.amazon.com/AWSEC2/latest/UserGuide/instance-types.html, which is incorporated by reference.

FIG. 6 is a more detailed diagram of a micromarket wireless transmitter device according to an example. As shown, the wireless transmitter has a microprocessor or micro controller device coupled to a memory resource, such as Flash memory or others. In an example, the processing device is coupled to an rf device, which generates, for example, a wireless signal based upon Bluetooth via antenna. The device has an external power source, power management, and battery, which is capable of stand alone operation or can be coupled to a wall outlet via a USB power outlet. An example can be found in at https://en.wikipedia.org/wiki/Bluetooth low energy beacon, which is incorporated by reference.

In an example, a product called RadBeacon USB manufactured by Radius Networks, Inc. can be used. The USB is a fully standalone proximity beacon using iBeacon™, AltBeacon™, and Eddystone™ technology implemented in a tiny USB package that can be powered by any available USB power source. The RadBeacon USB proximity beacon is easy to deploy, easy to maintain, reliable and long-lasting. Of course, there can be other variations, alternatives, and modifications.

FIG. 7 is a more detailed diagram of a micromarket application according to an example. In an example, the detailed diagram provides for a schema for configuring the present application. In an example, a user installs micromarket application on mobile wireless device. In an example, a user installs the application from the Apple App Store or the Google Play Store, or other storefront. The user selects the application, enters user information to access the store, and downloads the application onto the user's smart phone or other computing device, and configures the application with the phone settings and other configurations. Of course, there can be other variations, alternatives, and modifications.

In an example, the user creates an account and adds payment methods in application once it has been installed onto a memory resource of the phone and configured. In an example, the user creates the account using first name, last name, email address, password, physical address, and mobile phone number. Of course, there can be various alternatives, variations, and modifications.

In an example the user enters payment method. If payment method is a credit, debit or prepaid card, user enters the following information:
   a. Credit, debit or prepaid card number
   b. Card Verification Value (CVV)
   c. Card expiration date
   d. Name on card
   e. Billing address for card
   Other payment methods can be Automated Clearing House (ACH), payroll deduction, among others.

In an example, all entered payment methods are stored on server, so user can select one of them to purchase products from micro market. Of course, there can be other variations, alternatives, and modifications.

In an example, the user goes near micromarket and opens the application. The user opens application within the spatial region of Bluetooth beacon signal, or other suitable beacon signal. In particular, the application connects or pairs with the beacon signal. Of course, there can be other variations, alternatives, and modifications.

In an example, the application displays respective product information based on micromarket identification information. In an example, the application displays location name and address of nearby micro market. In an example, the application fetches available product categories, and names, images, descriptions, and prices of the products available in those categories in the nearby micro market, from the server—e.g. a carbonated beverage category, with the names, images, descriptions and prices of beverages available in that category.

User browses or searches for products, or scans products' UPC codes, and adds them to shopping cart.

In an example, the user browses products within the available shopping categories and adds them to shopping cart. The user searches for products by product name in Search box, and adds them to shopping cart. In an example, the user picks up products from the shelves or coolers, scans the UPC barcodes on the packages, and adds them to shopping cart. In an example, the user checks out and pays for products in shopping cart using the added payment method. Of course, there can be other variations, alternatives, and modifications.

In an example, the user checks out and pays for the items in shopping cart, by selecting a stored payment method. Of course, there can be other variations, alternatives, and modifications.

The above examples and implementations are not necessarily inclusive or exclusive of each other and may be combined in any manner that is non-conflicting and otherwise possible, whether they be presented in association with a same, or a different, embodiment or example or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above examples implementations are illustrative, rather than limiting.

FIG. 8 is a detailed diagram of an overall system architecture according to an example. As shown, the system has a plurality of clients, such as mobile devices, a web server, which can be coupled to each of the clients, and a database server, among other networking elements (not shown). The web server has work flows and components. The models have access components and helpers. A database, which will be further described, configures the present system.

In an example, the present invention provides a local area network system for a micro-market application. The system has a world wide network of computers, which comprising the Internet. In an example, the system has a micro market server device coupled to the world wide network of computers. In an example, the micro market server device has a library comprising a listing of a plurality of products, a field configured with the association information, e.g., an identifier for the server device. The device has a plurality of fields associated with a plurality of micromarket identification information. In an example, the system has a spatial region comprising a physical region having an effective radius of less than twenty feet. The system has a micromarket wireless transmitter device configured with identification information comprising an association identification information and a micromarket identification information. In an example, the micromarket wireless transmitter device is spatially disposed within the spatial region. The wireless transmitter is configured to transmit a beacon comprising wireless signal having a frequency ranging from 2 GHz to 3 GHz, among others. The system has a geofence region configured within a vicinity of the spatial region and derived from a perimeter of the wireless signal. The system has a micro market comprising a shelf configured with a wireless lock. The shelf having a plurality of products to be displayed. In an example, the system has a mobile wireless device of a user. The mobile wireless device comprises a processor device, a memory device, and a receiver for a local area network and a transceiver for communication to the world wide network of computers. The mobile wireless device can be a cell phone, such as a Smart Phone, tablet, or other computing device configured with a wireless transceiver.

In an example, the system has a micromarket application configured with the processor device to receive the association information and the micromarket identification information regarding the plurality of products within the geofence, when the mobile wireless device is within the geofence region by movement of the user, and initiates a connection with the wireless transmitter device, and upon the input of the association information and the micromarket identification to the micromarket application, the micromarket application initiates connection to the micro market server device which is configured to transfer product information regarding the plurality of products to the micromarket application.

In an example, an image capturing device (e.g., sensor, camera) is provided in the mobile wireless device, and is coupled to the micromarket application, and is configured to receive a UPC code associated with at least one of the plurality of products. In an example, the micromarket application is configured to transfer purchase information regarding the product into a shopping cart configured with the micromarket application and check out the product in exchange for a payment obligation for the product.

FIGS. 9 to 11 are various user interfaces for the micromarket application according to an example. In an example, FIG. 9 is a simplified illustration of a home screen, a shop screen, and a second shop screen (or panels) on the application. When user opens application within the spatial region of Bluetooth beacon signal, the home screen displays the micro market location name, address and other relevant information at the bottom, and any featured or advertised products or product categories at the top. In an example, the home screen provides a feedback link in header, which user can click to send feedback to the application provider or the micro market operator. In an example, the home screen provides a link to user's account, where user can edit account information. Of course, there can be other variations, alternatives, and modifications.

In an example, the shop screen for Product Categories is illustrated. The shop screen displays all available product categories in the nearby micro market. In an example, the shop screen provides a Search box for user to search for products by name. In an example, the shop screen displays shopping cart in header, with number of products currently in the cart. Of course, there can be other variations, alternatives, and modifications.

In an example, the shop screen for Products within Category is illustrated. In an example, the screen displays all available products within a category, along with name, image and price for each product. In an example, the user can add a product to shopping cart by clicking on the "Add to Cart" button. The screen displays shopping cart in header, with number of products currently in the cart. Of course, there can be other variations, alternatives, and modifications.

In an example, the mobile wireless device has a graphical user interface comprising a plurality of panels. In an example, the plurality of panels has a first panel comprises a featured product region, a micro-market region, and a tool bar having a home icon, a shop icon, a scan icon, a wallet icon, and a history icon. In an example, the interface has a second panel comprising a plurality of product categories spatially disposed within a center region of the second panel and a tool bar having a search icon. In an example, the user interface has a third panel comprising a plurality of product images and related price for each of the product images, and a tool bar comprising a shopping cart. Of course, there can be other variations, modifications, and alternatives.

In an example, FIG. 10 illustrates a scan screen, another scan screen, and a shopping cart screen for the application. The scan screen for scanning the UPC code for a product is shown. In an example, the screen is for processing the UPC code for the product, which the user selects. The screen displays a scan window using the mobile device's camera, where user positions UPC code on product package to scan it. Next, the screen has an interface to add the scanned product into a cart, as shown. Once the UPC code on product package is scanned, the user can verify product name and view price, and add product to shopping cart. Of course, there can be other variations, alternatives, and modifications.

Next, the application prompts a shopping cart screen. The screen displays all products in shopping cart with individual prices, as well as a total price. Optionally, the user can also remove certain products from shopping cart. Of course, there can be other variations, alternatives, and modifications.

FIG. 11 is an illustration of a check out screen, a wallet screen, and a history screen for the application. In an example, the check out screen displays subtotal from shopping cart, along with applicable discount, recycle refund value, sales tax, and a total. In an example, the screen displays all stored payment methods so users can select one to complete purchase. Of course, there can be other variations, alternatives, and modifications.

In an example, the application has the wallet screen. The user adds payment methods on the screen, as shown. The user can also view or remove all stored payment methods. In an example, the application has the history screen, which displays user's entire purchase history—order number, date and time of purchase, micro market location name, names and prices of purchased products, and order total. Of course, there can be other variations, alternatives, and modifications.

The above examples and implementations are not necessarily inclusive or exclusive of each other and may be combined in any manner that is non-conflicting and otherwise possible, whether they be presented in association with a same, or a different, embodiment or example or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above examples implementations are illustrative, rather than limiting.

FIG. 12 is a simplified diagram of a database schema according to an example. In an example, the database diagram has a beacon and VB.cart. In an example, the micromarket application via Bluetooth is configured to constantly listen (or receive signals from) for a nearby BLE beacon that are advertising a UUID(s) (unique IDs). In an example, when the application detects a beacon that is advertising a UUID that it recognizes as its own (i.e., designated UUID), it then reads the Major and Minor values of that beacon. Based on the Major and Minor values of the beacon, the application fetches the respective micro market's name and location, the product categories and the products (their names, descriptions, and prices) within them, and the shopping cart from the server, which is now connected to the application. The data for each micro market is stored in the "Beacon" table in the application's database.

In an example, when a user is in the spatial region of the Bluetooth beacon signal, the Beacon table is populated with values fetched from the server for the respective micro market. When the user leaves the spatial region, the data from this table is deleted. In an example, the data for the user's shopping cart is stored in the "Cart" table within the application's database and is also duplicated in a table in the server's database. If the user leaves the spatial region of the Bluetooth beacon signal, the shopping cart and the products in it are no longer displayed in the application. When user re-enters the spatial region of the Bluetooth beacon signal, the shopping cart and the products in it are reloaded from the server and displayed in the application. This allows the user to maintain a shopping cart for each micro market, even if user walks away from the micro market and then returns to complete the purchase. In an example, the data in the "Cart" table is deleted if the user removes all products from the shopping cart, or completes the purchase.

In an example, various hardware elements of the invention can be implemented using a smart phone according to an embodiment of the present invention. As shown, the smart phone includes a housing, display, and interface device, which may include a button, microphone, or touch screen. Preferably, the phone has a high-resolution camera device, which can be used in various modes. An example of a smart phone can be an iPhone from Apple Computer of Cupertino Calif. Alternatively, the smart phone can be a Galaxy from Samsung or others.

In an example, the smart phone includes the following features (which are found in an iPhone from Apple Computer, although there can be variations), see www.apple.com, which is incorporated by reference. In an example, the phone can include 802.11b/g/n Wi-Fi (802.11n 2.4 GHz only), Bluetooth 2.1+EDR wireless technology, Assisted GPS, Digital compass, Wi-Fi, Cellular, Retina display, 5-megapixel iSight camera, Video recording, HD (720p) up to 30 frames per second with audio, Photo and video geotagging, Three-axis gyro, Accelerometer, Proximity sensor, and Ambient light sensor. Of course, there can be other variations, modifications, and alternatives.

An exemplary electronic device may be a portable electronic device, such as a media player, a cellular phone, a personal data organizer, or the like. Indeed, in such embodiments, a portable electronic device may include a combination of the functionalities of such devices. In addition, the electronic device may allow a user to connect to and communicate through the Internet or through other networks, such as local or wide area networks. For example, the portable electronic device may allow a user to access the internet and to communicate using e-mail, text messaging, instant messaging, or using other forms of electronic communication. By way of example, the electronic device may be a model of an iPod having a display screen or an iPhone available from Apple Inc.

In certain embodiments, the device may be powered by one or more rechargeable and/or replaceable batteries. Such embodiments may be highly portable, allowing a user to carry the electronic device while traveling, working, exercising, and so forth. In this manner, and depending on the functionalities provided by the electronic device, a user may listen to music, play games or video, record video or take pictures, place and receive telephone calls, communicate with others, control other devices (e.g., via remote control and/or Bluetooth functionality), and so forth while moving freely with the device. In addition, device may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device includes an enclosure or housing, a display, user input structures, and input/output connectors. The enclosure may be formed from plastic, metal, composite materials, or other suitable materials, or any combination thereof. The enclosure may protect the interior components of the electronic device from physical damage, and may also shield the interior components from electromagnetic interference (EMI).

The display may be a liquid crystal display (LCD), a light emitting diode (LED) based display, an organic light emitting diode (OLED) based display, or some other suitable display. In accordance with certain embodiments of the present invention, the display may display a user interface and various other images, such as logos, avatars, photos, album art, and the like. Additionally, in one embodiment, the display may include a touch screen through which a user may interact with the user interface. The display may also include various function and/or system indicators to provide feedback to a user, such as power status, call status, memory status, or the like. These indicators may be incorporated into the user interface displayed on the display.

In an embodiment, one or more of the user input structures are configured to control the device, such as by controlling a mode of operation, an output level, an output type, etc. For instance, the user input structures may include a button to turn the device on or off. Further the user input structures may allow a user to interact with the user interface on the display. Embodiments of the portable electronic device may include any number of user input structures, including buttons, switches, a control pad, a scroll wheel, or any other suitable input structures. The user input structures may work with the user interface displayed on the device to control functions of the device and/or any interfaces or devices connected to or used by the device. For example, the user input structures may allow a user to navigate a displayed user interface or to return such a displayed user interface to a default or home screen.

The exemplary device may also include various input and output ports to allow connection of additional devices. For example, a port may be a headphone jack that provides for the connection of headphones. Additionally, a port may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device may use the input and output ports to connect to and send or receive data with any other device, such as other portable electronic devices, personal computers, printers, or the like. For example, in one embodiment, the device may connect to a personal computer via an IEEE-1394 connection to send and receive data files, such as media files. Further details of the device can be found in U.S. Pat. No. 8,294,730, assigned to Apple, Inc.

In an example, the present invention provides a method of securing a transaction associated with a product, e.g., food product, consumer product, or any other product. In an example, the method is performed within a local area network system for a micro-market application. In an example, the method includes configuring a micro market server device to a micromarket wireless transmitter device configured with identification information comprising an association identification information and a micromarket identification information. In an example, the micromarket wireless transmitter device is spatially disposed within a spatial region comprising a physical region having an effective radius of less than twenty feet or can be other distances. In an example, the micro market server device is coupled to a world wide network of computers.

In an example, the micro market server device comprises a library comprising a listing of a plurality of product, a field configured with the association information, the association information being an identifier for the server device, and a plurality of fields associated with a plurality of micromarket identification information.

In an example, the method includes transmitting a beacon comprising wireless signal having a frequency ranging from 2 GHz to 3 GHz from the micromarket wireless device to cause formation of a geofence region configured within a vicinity of the spatial region and derived from a perimeter of the wireless signal from the micro market wireless transmitter device such that the geofence region is within a vicinity of a micro market comprising a shelf configured with a wireless lock. In an example, the shelf has a plurality of products to be displayed. In an example, the product information associated with the plurality of products is provided in a product catalog file.

In an example, the method includes initiating movement of a mobile wireless device. The mobile wireless device comprises a processor device, a memory device, and a receiver for a local area network and a transceiver for communication to the world wide network of computers toward the geofence region. In an example, the mobile wireless device is selected from a smart phone, a cellular phone, a tablet computer, or a laptop computer.

In an example, the method includes receiving the association information and the micromarket identification information regarding the plurality of products within the geofence at an input handler of a micromarket application configured with the processor device, when the mobile wireless device is within the geofence region by movement of the user.

The method includes connecting with the micromarket wireless transmitter device to initiate connection to the micro market server device, transferring product information regarding the plurality of products from the micro market server device through the world wide network of computers to the micromarket application of the user, and initiating movement of the mobile wireless device to capture, using an image capturing device of the mobile wireless device, an image of a UPC code associated with at least one of the plurality of products. The method prompting a panel (e.g., screen) on micromarket application to either add to a shopping cart or cancel a request to purchase the product associated with the UPC code. The method selecting add to shopping cart to initiate a check out the product in exchange for a payment obligation for the product.

In an example, the wireless transmitter device is configured with a Bluetooth device having a frequency of 2.4 GHz, the wireless transmitter comprises a Bluetooth transmitter coupled to a power management module. The wireless transmitter device is free from any connection to the world wide network of computers. The wireless transmitter device comprises a Bluetooth wireless integrated circuit device. The Bluetooth wireless integrated circuit device is coupled to a RF wireless device coupled to an antenna for transmission of the 2.4 GHz signal. In an example, the power management module is coupled to an external AC or DC power source.

In an example, the method comprises transferring analytics of the user from the micromarket application. The analytics can include both phenotype or genotype data about the user, and any preference information.

In an example, the micromarket application comprises a security module. In an example, the security module is configured to transfer a key using a 2.4 GHz wireless signal to the wireless lock when the product has been checked out in exchange for the payment such that the wireless lock is released to allow the user to remove the product from the micromarket. In an example, the micromarket application comprises a security module, the security module configured to transfer a key to the wireless lock when the product has been checked out in exchange for the payment such that the wireless lock is released to allow the user to remove the product from the micromarket, or when the product is accessed by the user such that the wireless lock is released to allow the user with access to the product in the micromarket.

In an example, the micromarket wireless transmitter is physically attached to a back of a shelf of the micromarket to physically secure the micromarket wireless transmitter, and to be out of sight of any user of the micromarket. The wireless transmitter can be self powered via a battery or other energy source, or be plugged into a power source via a USB connection or other interface.

In an example, the micromarket is within a private office area with a plurality of users, each of which is an employee or guest of a company. In an example, the private office area is free from any kiosk or other vending machine or may have vending machines, coolers, and shelves.

In an example, the method includes transferring an alert from the micromarket server to the micromarket application once connection has been established between the micromarket application and the micromarket wireless transmitter device. In an example, the method includes transferring an alert from the micromarket server to the micromarket application once connection has been established between the micromarket application and the micromarket wireless transmitter device, the alert being associated with one of the plurality of products.

Having described various embodiments, examples, and implementations, it should be apparent to those skilled in the relevant art that the foregoing is illustrative only and not limiting, having been presented by way of example only. Many other schemes for distributing functions among the various functional elements of the illustrated embodiment or example are possible. The functions of any element may be carried out in various ways in alternative embodiments or examples.

Also, the functions of several elements may, in alternative embodiments or examples, be carried out by fewer, or a single, element. Similarly, in some embodiments, any functional element may perform fewer, or different, operations than those described with respect to the illustrated embodiment or example. Also, functional elements shown as distinct for purposes of illustration may be incorporated within other functional elements in a particular implementation. Also, the sequencing of functions or portions of functions generally may be altered. Certain functional elements, files, data structures, and so one may be described in the illustrated embodiments as located in system memory of a particular or hub. In other embodiments, however, they may be located on, or distributed across, systems or other platforms that are co-located and/or remote from each other. For example, any one or more of data files or data structures described as co-located on and "local" to a server or other computer may be located in a computer system or systems remote from the server. In addition, it will be understood by those skilled in the relevant art that control and data flows between and among functional elements and various data structures may vary in many ways from the control and data flows described above or in documents incorporated by reference herein. More particularly, intermediary functional elements may direct control or data flows, and the functions of various elements may be combined, divided, or otherwise rearranged to allow parallel processing or for other reasons. Also, intermediate data structures of files may be used and various described data structures of files may be combined or otherwise arranged.

In other examples, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed:

1. A method of using a micro-market application coupled to a world wide network of computers, the method comprising:

in a world wide network of computers, the world wide network of computers comprising the Internet; a micro market server device coupled to the world wide network of computers, the micro market server device comprising:
a library comprising a listing of a plurality of products;
a field configured with the association information, the association information being an identifier for the server device; and
a plurality of fields associated with a plurality of micromarket identification information;
a spatial region comprising a physical region having a radius;
a micromarket wireless transmitter device configured with identification information comprising an association identification information and a micromarket identification information, the micromarket wireless transmitter device spatially disposed within the spatial region, the wireless transmitter configured to transmit a beacon comprising wireless signal having a frequency ranging from 2 GHz to 3 GHz;

a geofence region configured within a vicinity of the spatial region and derived from a perimeter of the wireless signal;

a micro market comprising a shelf configured with a wireless lock, the shelf having a plurality of products to be displayed;

using a mobile wireless device of a user, the mobile wireless device comprising a processor device, a memory device, and a receiver for a local area network and a transceiver for communication to the world wide network of computers and a micromarket application configured with the processor device to receive the association information and the micromarket identification information regarding the plurality of products within the geofence, when the mobile wireless device is within the geofence region by movement of the user, and initiates a connection with the wireless transmitter device, and upon the input of the association information and the micromarket identification to the micromarket application, the micromarket application initiates connection to the micro market server device which is configured to transfer product information regarding the plurality of products to the micromarket application;

receiving a uniform product code ("UPC") code associated with at least one of the plurality of products using an image capturing device provided in the mobile wireless device, and coupled to the micromarket application, and configured to receive the UPC code associated with at least one of the plurality of products, and;

transferring purchase information regarding the product into a shopping cart using the micromarket application configured to transfer the purchase information regarding the product into the shopping cart configured with the micromarket application and check out the product in exchange for a payment obligation for the product.

2. The method of claim 1 wherein the wireless transmitter device is configured with a Bluetooth device having a frequency of 2.4 GHz; and wherein the micromarket identification information consists of a universally unique identifier ("UUID"), and the Bluetooth device is not paired with the micromarket application.

3. The method of claim 1 wherein the product information associated with the plurality of products is provided in a product catalog file.

4. The method of claim 1 wherein the mobile wireless device is selected from a smart phone, a cellular phone, a tablet computer, or a laptop computer, the mobile wireless device having a graphical user interface comprising a plurality of panels, the plurality of panels having a first panel comprising a featured product region, a micromarket region, and a tool bar having a home icon, a shop icon, a scan icon, a wallet icon, and a history icon, a second panel comprising a plurality of product categories spatially disposed within a center region of the second panel and a tool bar comprising a search region, and a third panel comprising a plurality of product images and related price for each of the product images, and a tool bar comprising a shopping cart.

5. The method of claim 1 wherein the micromarket application comprises a security module, the security module configured to transfer a key to the wireless lock when the product has been checked out in exchange for the payment such that the wireless lock is released to allow the user to remove the product from the micromarket, or when the product is accessed by the user such that the wireless lock is released to allow the user with access to the product in the micromarket.

6. The method of claim 1 wherein the micromarket application comprises a security module, the security module configured to transfer a key using a 2.4 GHz wireless signal to the wireless lock when the product has been checked out in exchange for the payment such that the wireless lock is released to allow the user to remove the product from the micromarket.

7. The method of claim 1 wherein the micromarket wireless transmitter is physically attached to a back of a shelf of the micromarket to physically secure the micromarket wireless transmitter, and to be out of sight of any user of the micromarket.

8. The method of claim 1 wherein the micromarket is within a private office setting having a plurality of users, each of the users is an employee or a guest of a company.

9. The method of claim 1 further comprising an alert module configured to transfer an alert from the micromarket server to the micromarket application once connection has been established between the micromarket application and the micromarket wireless transmitter device.

10. The method of claim 1 further comprising an alert module provided in the micromarket server, the alert module being configured to transfer an alert from the micromarket server to the micromarket application once connection has been established between the micromarket application and the micromarket wireless transmitter device, the alert being associated with one of the plurality of products.

11. A method of securing a transaction associated with a product, the method is performed within a local area network system for a micro-market application, the method comprising:

configuring a micro market server device to a micromarket wireless transmitter device configured with identification information comprising an association identification information and a micromarket identification information, the micromarket wireless transmitter device spatially disposed within a spatial region comprising a physical region having a radius, the micro market server device coupled to a world wide network of computers, the micro market server device comprising:

a library comprising a listing of a plurality of product;

a field configured with the association information, the association information being an identifier for the server device; and a plurality of fields associated with a plurality of micromarket identification information;

transmitting a beacon comprising wireless signal having a frequency ranging from 2 GHz to 3 GHz from the micromarket wireless device to cause formation of a geofence region configured within a vicinity of the spatial region and derived from a perimeter of the wireless signal from the micro market wireless transmitter device such that the geofence region is within a vicinity of a micro market comprising a shelf configured with a wireless lock, the shelf having a plurality of products to be displayed;

initiating movement of a mobile wireless device, the mobile wireless device comprising a processor device, a memory device, and a receiver for a local area network and a transceiver for communication to the world wide network of computers toward the geofence region;

receiving the association information and the micromarket identification information regarding the plurality of products within the geofence at an input handler of a micromarket application configured with the processor device, when the mobile wireless device is within the geofence region by movement of the user;

connecting with the micromarket wireless transmitter device to initiate connection to the micro market server device;

transferring product information regarding the plurality of products from the micro market server device through the world wide network of computers to the micromarket application of the user;

initiating movement of the mobile wireless device to capture, using an image capturing device of the mobile wireless device, an image of a uniform product code ("UPC") code associated with at least one of the plurality of products;

prompting a panel on micromarket application to either add to a shopping cart or cancel a request to purchase the product associated with the UPC code;

selecting add to shopping cart to initiate a check out of the product in exchange for a payment obligation for the product.

12. The method of claim 11 wherein the wireless transmitter device is configured with a Bluetooth device having a frequency of 2.4 GHz, the wireless transmitter comprises a Bluetooth transmitter coupled to a power management module, the wireless transmitter device being free from any connection to the world wide network of computers, the wireless transmitter device comprises a Bluetooth wireless integrated circuit device, the Bluetooth wireless integrated circuit device being coupled to a radio frequency ("RF") wireless device coupled to an antenna for transmission of the 2.4 GHz signal, the power management module coupled to an external alternating current ("AC") or direct current ("DC") power source.

13. The method of claim 11 wherein the product information associated with the plurality of products is provided in a product catalog file.

14. The method of claim 11 wherein the mobile wireless device is selected from a smart phone, a cellular phone, a tablet computer, or a laptop computer.

15. The method of claim 11 further comprising transferring analytics of the user from the micromarket application.

16. The method of claim 11 wherein the micromarket application comprises a security module, the security module configured to transfer a key using a 2.4 GHz wireless signal to the wireless lock when the product has been checked out in exchange for the payment such that the wireless lock is released to allow the user to remove the product from the micromarket.

17. The method of claim 11 wherein the micromarket wireless transmitter is physically attached to a back of a shelf of the micromarket to physically secure the micromarket wireless transmitter, and to be out of sight of any user of the micromarket.

18. The method of claim 11 wherein the micromarket is within a private office area with a plurality of users, each of which is an employee of a company, the private office area is free from any kiosk or other vending machine.

19. The method of claim 11 further transferring an alert from the micromarket server to the micromarket application once connection has been established between the micromarket application and the micromarket wireless transmitter device.

20. The method of claim 11 further transferring an alert from the micromarket server to the micromarket application once connection has been established between the micromarket application and the micromarket wireless transmitter device, the alert being associated with one of the plurality of products.

* * * * *